(12) United States Patent
Lei et al.

(10) Patent No.: US 8,825,886 B2
(45) Date of Patent: Sep. 2, 2014

(54) SYSTEM AND METHOD FOR EVALUATING NETWORK TRANSPORT EFFECTS ON DELIVERY OF MEDIA CONTENT

(75) Inventors: Zhibin Lei, Hong Kong (HK); Dah Ming Chiu, Hong Kong (HK); Zhengjia Fu, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 0 days.

(21) Appl. No.: 12/844,849

(22) Filed: Jul. 28, 2010

(65) Prior Publication Data

US 2012/0030367 A1     Feb. 2, 2012

(51) Int. Cl.
*G06F 15/16*     (2006.01)
*H04N 21/63*     (2011.01)
*H04N 21/24*     (2011.01)
*H04L 29/08*     (2006.01)

(52) U.S. Cl.
CPC ............ *H04N 21/632* (2013.01); *H04L 67/108* (2013.01); *H04N 21/2402* (2013.01)
USPC ........................................................ 709/231

(58) Field of Classification Search
None
See application file for complete search history.

(56) References Cited

U.S. PATENT DOCUMENTS

| | | |
|---|---|---|
| 7,266,147 B2 | 9/2007 | Deshpande |
| 2006/0120463 A1 | 6/2006 | Wang |
| 2007/0097885 A1* | 5/2007 | Traversat et al. ............. 370/254 |
| 2007/0174471 A1* | 7/2007 | Van Rossum ................ 709/229 |
| 2008/0037527 A1* | 2/2008 | Chan et al. .................... 370/353 |
| 2008/0089414 A1* | 4/2008 | Wang et al. .............. 375/240.13 |
| 2008/0155120 A1* | 6/2008 | Argawal et al. ............... 709/242 |
| 2008/0307107 A1* | 12/2008 | Chen et al. .................... 709/231 |
| 2009/0180545 A1 | 7/2009 | Wu et al. |
| 2009/0259710 A1* | 10/2009 | Porio et al. .................... 709/201 |
| 2010/0049867 A1* | 2/2010 | Panwar et al. ................ 709/231 |
| 2010/0080290 A1* | 4/2010 | Mehrotra ................. 375/240.07 |
| 2010/0229222 A1* | 9/2010 | Li et al. ............................ 726/5 |
| 2011/0129079 A1* | 6/2011 | Simonds .................. 379/207.16 |

OTHER PUBLICATIONS

International Telecommunication Union, "ITU-R Recommendation BT.500-11: Methodology for the subjective assessment of the quality of television pictures," 2002.
International Telecommunication Union, "ITU-R Recommendation P.910: Subjective video quality assessment methods for multimedia applications," Sep. 1999.
International Telecommunication Union, "ITU-T Recommendation J.11: Hypothetical reference circuits for sound-programme transmission," 1988.

(Continued)

*Primary Examiner* — Ninos Donabed
(74) *Attorney, Agent, or Firm* — Ella Cheong Hong Kong; Sam T. Yip (57) ABSTRACT

A system and a method for evaluating transport of data segments of media content bitstream over a peer-to-peer network by streaming data chunks of a media content through a peer-to-peer network, generating network transport distortion on the data chunks using live experiments, simulation, or artificial generation, determining a playback strategy of each of the data segment at the receiver end, and evaluating a playback performance of the media content bitstream under the playback strategy.

5 Claims, 6 Drawing Sheets

(56) References Cited

OTHER PUBLICATIONS

Q, Huynh-Thu, M. Ghanbari, D. Hands and M. Brotherton, "Subjective video quality evaluation for multimedia applications," in Proceedings of SPIE Human Vision and Electronic Imaging, 6057, pp. 6057D.1-60571D.11, Jan. 16-18, 2006.

S. Winkler and R. Campos, "Video quality evaluation for internet streaming applications,"in Proceedings of SPIE Human Vision and Electronic Imaging, 5007, pp. 104-115, Jan. 20-24, 2003.

Video Quality Experts Group, "Final Report From The Video Quality Experts Groups on The Validation of Objective Models Of Multimedia Quality Assessment, Phase I", Version 2.6, Sep. 12, 2008.

X. Zhang, J. Liu, B. Li and T. S. P. Yum, "CoolStreaming/DONet: A data/driven overlay network for efficient live media streaming," In Proceedings of IEEE Inforcom, Mar. 2005.

Y. Huang, T. Z. J. Fu, D. M. Chiu, J.C. S. Lui and C. Huang, "Challenges, design and analysis of a large-scale P2P-VoD system," In Proceedings of ACM Sigcomm, 2008.

Y. Zhou, D. M. Chiu and J. C. S. Lui, "A simple model for analyzing P2P streaming protocols," In proceedings of IEEE ICNP, Oct. 2007.

\* cited by examiner

SYSTEM AND METHOD FOR EVALUATING NETWORK TRANSPORT EFFECTS ON DELIVERY OF MEDIA CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to transmission of data over electronic signal delivery medium; more specifically to transmission of multimedia content, including but not limited to video, audio, and textual content, over electronic signal delivery medium, including but not limited to computing device local area network, computer wide area network, wireless network, cellular network, and television networks.

BACKGROUND

Increasingly, multimedia content, such as digital video clips and audio sound bits, is transported over computing device networks, such as the Internet. There are many mechanisms for transporting multimedia content through a computing device network.

Traditionally, multimedia content is transported using a client-server mechanism, in which one or a set of multiple server computing devices are dedicated to hosting and delivering the multimedia content and another one or a set of multiple client devices are dedicated to receiving the multimedia content. In this case, efficiency of the content transportation can be improved by strategically placing intermediate server computing devices, acting as proxies for the server computing devices, caching and delivering the multimedia content to those client devices that are close to them in the network.

Recently, it has become popular to use peer-assisted mechanisms. In this case, the client devices that are receiving the multimedia content themselves replace the intermediate server computing devices in the client-server case as proxies, cache and re-deliver the multimedia content to other client devices. There are still many other content transport mechanisms and efficiency improvement schemes such as single or multiple tree-based application layer multicast, peer-to-peer file downloading, peer-to-peer streaming, and content distribution network (CDN). Collectively, they are referred to as "peer-to-peer" networks (hereinafter referred to as P2P networks).

In addition to multimedia content being playback by the client device only after the entire content file is received, delivery and playback are often done concurrently, also known as "streaming," regardless of which transportation mechanism or efficiency improvement scheme is used.

For traditional file transfers through a computing device network, a simple quantifiable measurement, such as total delay of the transportation of the file, can be used as an assessment objective. For multimedia content streaming, however, the assessment objective is the quality of the playback experience (hereinafter referred to as QoE), a more elusive and subjective measurement. The only accepted method for measuring QoE is through subjective scoring by representative human audience of the multimedia content being played.

However, a QoE assessment process comprises of multiple subjective scorings is labor-intensive and time-consuming. Ideally, each subjective scoring should be repeated for different settings (network topologies, protocols, algorithms, transport mechanisms, efficiency improvement schemes, and number of audiences, etc), and different types of contents. Furthermore, results of the QoE assessment process should be repeatable to be convincing. In reality, large-scale QoE assessment experiments are very difficult to implement. Some testers use PlanetLab (http://www.planet-lab.org), a collaboration of vast number of computers connected to the Internet around the world, serving as testbed for overlay networks. However, two experiments performed using PlanetLab can hardly be implemented with identical settings such as identical set of computers, much less repeatable results. Another way is to use certain unique content to attract a large audience to participate in an experiment. For example, tests were done during the 2008 Olympics broadcasting. Although such experiments can be reasonably large-scale, they cannot be easily repeated.

Video quality assessments for traditional television contents and related applications have received much attention in the past. There are a number of publications and standards available. For example, International Telecommunication Union, "Recommendation ITU-R BT.500-11—Methodology for the subjective assessment of the quality of television pictures." (2002) (Contents of which are hereby incorporated by reference) and International Telecommunication Union, "ITU-T Recommendation P.910 Subjective video quality assessment methods for multimedia applications." (1999) (Contents of which are hereby incorporated by reference). Although some concrete methods designed for subjective assessment of video quality in multimedia applications were discussed in these publications, they do not provide any technical specifications for experimenting on personal computers in computing device networks.

More recently, there are studies on subjective assessments of 3 L-video, namely low-bit rate, low-frame rate, and low-resolution video, which constitutes most of the video content streamed on the Internet. In these assessment studies, each reference sequence (SRC) of content was processed through a number of error conditions, or so called Hypothetical Reference Circuits (HRC), to generate processed video sequences (PVS). The HRC considered so far is suitable for streaming content using client-server mechanism where there is a single link between a server computing device and a client device, and packet loss rate is considered to be the only type of network transmission errors. But such HRC method has limitation in applicability in P2P networks because the HRC method considers packet loss rate as the only type of network transmission error.

When transporting content in P2P networks, the minimum processing unit of the content being transported is no longer packets but chunks. A network packet is a data segment of the content being transported and typically ranges from a few hundreds to tens of thousands of bits in size. A chunk, on the other hand, composes of several consecutive audio and video frames of the content and its length can be from hundreds of milliseconds to one second in uninterrupted playback time. Although the size of a chunk depends on the actual implementation of the particular transport mechanism, the network, and the content streaming application, in any case a chuck is much larger than a packet.

In P2P content streaming applications, almost all the important building blocks and components are designed to handle chunks. For example, chunk selection algorithm, peer selection algorithm that is based on chunk bit-map information exchanged among neighbor peers, and local chunk buffer management. Therefore, in order to assess the QoE of the streamed content transported through P2P networks, innovative methods for generating and extracting chunk-level impairments are needed.

U.S. Patent Application Publication No. 2006/0120463, U.S. Patent Application Publication No. US 2009/0180545, and U.S. Pat. No. 7,266,147 disclose the designs and implementations of Hypothetical Reference Decoders. These disclosures focus on how to evaluate different encoding and decoding methods for the video streaming application without reference to content transportation through the network. On the other hand, the presently disclosed invention is a system and a method for conducting test or experiments of assessing QoE of content playback transported using P2P. It primarily focuses on the chunk-level impairments generated by the network transport components, and neither the media encoder nor the decoder.

In summary, some of the prior arts disclose methods of assessing network transport effects but they were not specific to the transport of streamed multimedia content. Other prior arts disclose methods of assessing network transport effects with specificity on streamed media content, but the methods disclosed focus on packet-level network transport effects and transported using non-P2P network. Still other prior arts disclose methods of transporting media content itself and not of assessing the network transport effects.

SUMMARY

It is an objective of the presently claimed invention to provide a method and a system of investigating and evaluating the effect of network transport on multimedia content bitstream. It is a further objective to provide such a method and a system as tools for QoE assessment and basis for evaluating and improving multimedia content delivery platforms and playback strategies, in turn enhancing the total user experience of the multimedia content audience.

The presently claimed invention can be used on any network when assessing the effect of network transport factors at the chunk level on end user experience of the content audience. The network can be of any kind and have any kind of network architecture, including but is not limited to the Internet, broadband, wireless, and internal computer networks. The claimed method of the invention is also applicable for quality assessment of network transported media content based on end user subjective assessment or objective QoE measurement.

Disclosed herein is a computer implementable method of evaluating transport of data segments of media content bitstream over a network, comprising providing data segments from the media content bitstream, generating network transport distortion during transport of the data segments, receiving the data segments, determining a playback strategy of each received data segment, and evaluating a playback performance of the media content bitstream under the playback strategy; wherein each of the data segments is a chunk.

In accordance with various embodiments, the network transport distortion factors are generated by one or more methods selected from live experiments, simulation, or artificial generation. Other methods within the average skill of the skilled user can equally be employed. In accordance with exemplary embodiments, the network transport distortion factors are represented by either or both of a data segment delay distribution and a per data segment download pattern, which can be represented graphically. The former is aggregate statistics for all delayed data segments. The latter describes how an individual data segment is filled whilst being downloaded. Thus, the network transport distortion factors can be measured at coarse and finer granularity levels respectively.

In accordance with various embodiments, once the network transport distortion factors are introduced to the data segment being transported, the playback strategies included is not limited to waiting until a data segment is completely received before sending it to a media content decoder for playback of the media content, immediately sending an partially received data segment to a media content decoder for playback of the media content, or waiting for a data segment to be completely received for a pre-defined longest waiting time before sending it to a media content decoder for playback of the media content.

In accordance with various embodiments, the evaluating of media content playback performance comprises determining correlation between the generated network transport distortion factors and a subjective quality of experience user metric of the playback performance. Any suitable mechanism may be employed to obtain the quality of experience user metric, such as Mean Opinion Scoring (MOS). In accordance with one exemplary embodiment, a panel of expert end users may be assembled, after statistical profiling to eliminate biased panel members, collect and compile the panel's collective rank of performance of the received media content bitstream. In accordance with another exemplary embodiment, typical end users participate to rank a received media content bitstream after training in how to rank performance of received media. The user testing is carried out on the end users' individual machines and MOS data is collected using a data collection tool.

BRIEF DESCRIPTION OF THE DRAWINGS

Embodiments of the invention are described in more detail hereinafter with reference to the drawings, in which.

DETAILED DESCRIPTION

In the following description, methods of evaluating transport of data segments of a media content bitstream over a network, methods of manipulating a media content bitstream for delivery over a P2P network, computer program products and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
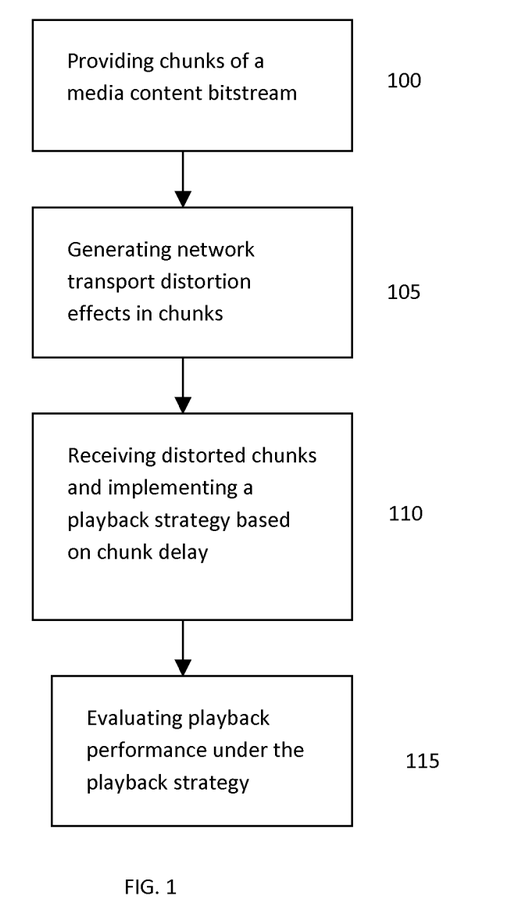
FIG. 1 shows an illustration of the steps performed by one embodiment according to the claimed invention.

As shown in FIG. 1, the method consists of providing chunks of a media content bitstream 100, generating network transport distortion effects in chunks 105, receiving distorted chunks, determining and implementing a playback strategy based on chunk delay 110, and evaluating playback performance under the playback strategy 115.

Figure 2:
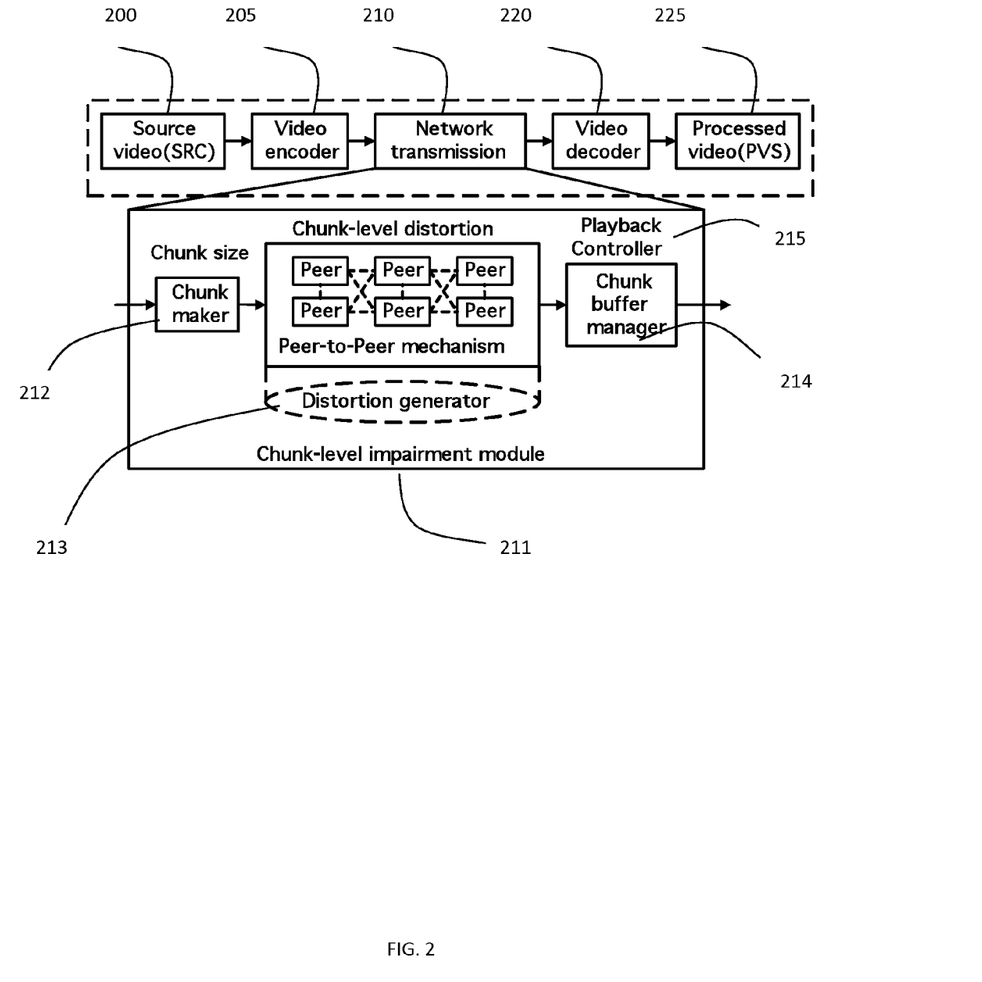
FIG. 2 shows an illustration of a typical system implementing an embodiment of the claimed invention.

Referring to FIG. 2, the overall process consists of source video (SRC) 200, a video encoder 205, network transmission 210, a video decoder 220 and processed video (PVS) 225. Different media codecs, transmission rate may be chosen at the video encoder 205. After being decoded by the video decoder 220, the processed videos 225 are then displayed on monitors (not shown) to users. In the bottom part of FIG. 2, the chunk-level impairment module 211 comprises three components: a chunk maker 212, a chunk-level distortion generator 213, and chunk buffer manager 214. The chunk maker 212 is responsible for organizing video stream packets into chunks according to pre-defined configuration parameters, such as chunk size. These chunks are then distributed through the P2P overlay of the chunk-level distortion generator 213, during which, various types of chunk-level distortion effects are introduced. After receiving the video chunks, each peer client (not shown) manages and keeps the received chunks in a local chunk-level buffer (not shown), similar to the chunk buffer manager 214, for continuing sharing with other peers. At the same time, the peer client needs to make a playback decision for each chunk, such as through a playback controller function. When a chunk is received in a time shorter than its playback time, the playback controller 213 will remove it from the local chunk-level buffer and send it to the decoder 220 and player (not shown). Preferably the playback controller 215 is running at the network streaming layer above the media (video and audio) codec layer. Hence, it is transparent to any codec used, and can be designed to take into consideration of various tradeoffs in a typical streaming applications. In the embodiment illustrated in FIG. 2 the chunk-level distortion generator 213 is independent of the playback controller 215. In other words, the playback controller 215 and local buffer manager 214 are not aware of how the chunk-level distortion effects are generated.

In exemplary embodiments, the following parameters are used to define chunk-level distortion:

$T_i^e$: the expected playback time of the $i^{th}$ chunk;
$T_i^s$: the download start time of chunk i;
$T_i^c$: the download completion time of chunk i;

1. Data segment-level delay: Chunk i is delayed if its download completion time is later than its expected playback time. The data segment-level delay length of the $i^{th}$ chunk is defined as:

$$D_i = \{T_i^c - T_i^e\}^+, \text{ where } \{x\}^+ = x \text{ when } x > 0, \text{ otherwise } 0$$

2. Data segment delay distribution (DSDD): Data segment delay distribution is an aggregate statistic for all delayed data segments. In the simplest case, it can be represented by a discrete random variable. For example, if $X=\{1, 2\}$ (second), $p(X=1)=p(X=2)=0.5$, all delayed data segments encounter delay length of either 1 or 2 seconds with equal probability. Less restrictive assumptions can be made for other generalized scenarios.

3. Data segment receiving pattern (DSRP): Data segment receiving pattern describes how a data segment, say chunk i, is filled over the whole downloading process. If we denote $f_i(t), t \in [T_i^s, T_i^c]$, to be the download completion percentage of chunk i at time t, then $f_i(t)$ is a non-decreasing function and $f_i(T_i^s)=0$; $f_i(T_i^c)=1$. Mathematically, the DSRP may be represented by any increasing curve of $f_i(t)$ over $t \in [T_i^s, T_i^c]$. DSDD is therefore in a coarser granularity than the DSRP, as such the delay distribution information can be inferred if we have the complete trace of the DSRP for each chunk.

Figure 3:
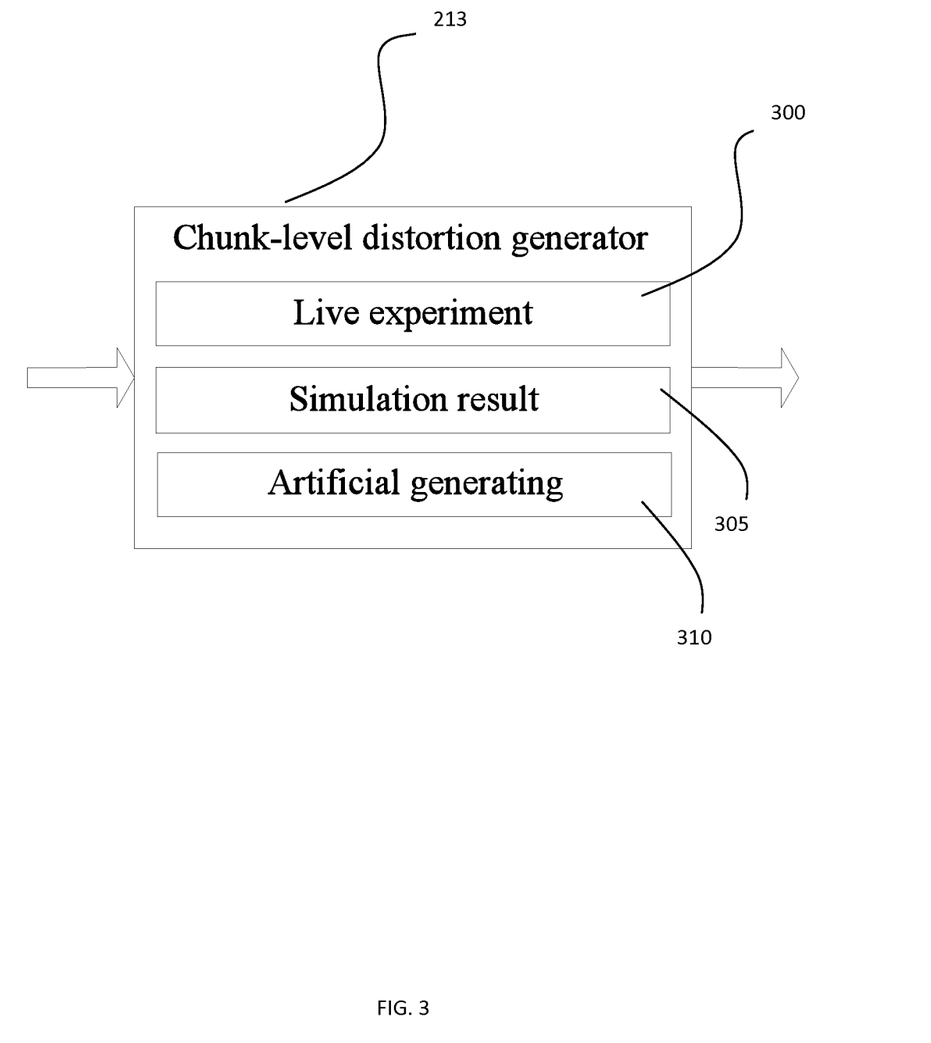
FIG. 3 shows a block diagram schematically illustrating three different ways of generating chunk-level distortion effects.

Referring to FIG. 3, three different ways of generating chunk-level distortion effects are illustrated. Other ways (not shown) are implemented in alternative embodiments. Each method may be used to generate either the DSDD or the DSRP as required. The first way is by live experiments 300. The detailed DSRP for each chunk can be collected and recorded during a real-life experiment, such as a P2P-assisted broadcast. Alternatively, such experiments could be based on PlanetLab. The second way is by doing network transport simulation 305. With simulation, it is possible to simulate a large network with a large number of users, and have the simulation repeatable. The same kinds of DSRP traces can be collected from the simulation experiments. The third way is by artificial generating 310. Instead of letting experiments or simulations determine the distortion effects, different possible chunk delays can be created by following a selected distribution, together with chunk-level receiving patterns by implementing $f_i(t)$ with different increasing curves.

Figure 4:
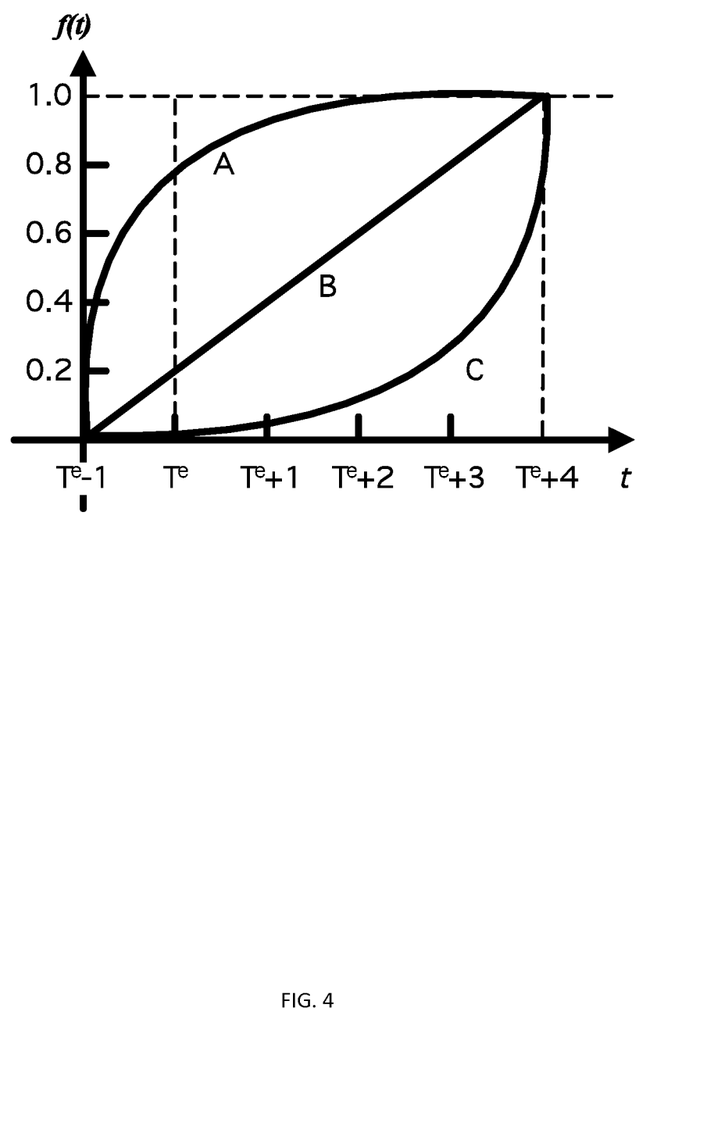
FIG. 4 shows an illustration of three different increasing curves that could be applied to implement the data segment receiving pattern.

FIG. 4 illustrates an example of three different increasing curves that could be applied to implement $f_i(t)$ when we manually generate the chunk-level distortion effects. In this example, three increasing curves (A, B and C) have the same start downloading time $T_i^s$ (1 second before the expected playback time, $T_i^e$) and finish time $T_i^c$ (4 seconds after the $T_i^e$). However, in any time within this duration, chunk generated by curve A will always receive more contents than that of B and C. Especially at $t=T_i^e$, the expected playback time, A generates chunk around 80% complete while B only generates 20% and C close to 0%.

Figure 5:
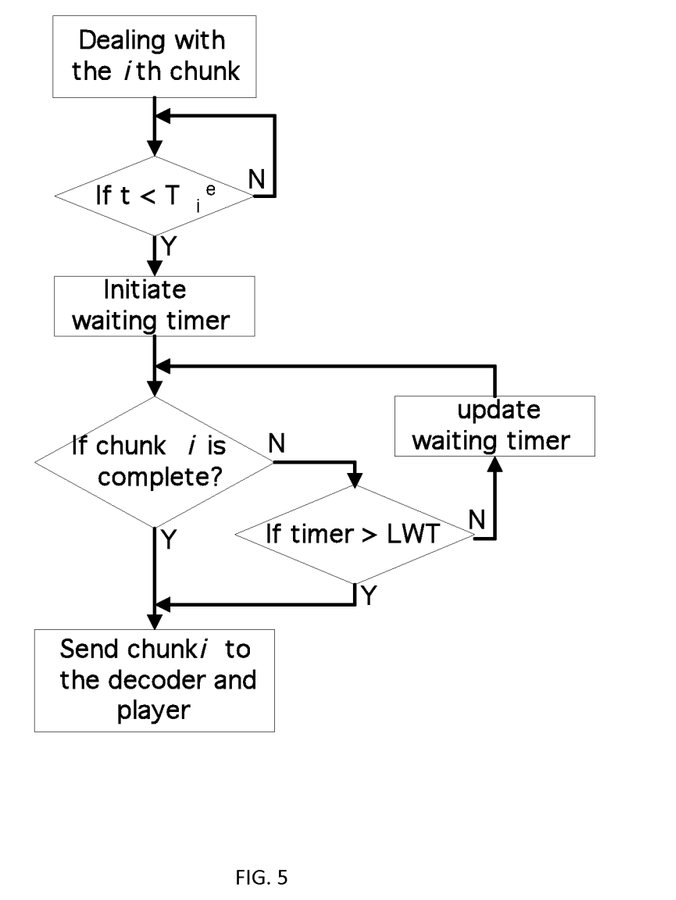
FIG. 5 shows an illustration of the steps performed by the playback controller which determines the playback strategy according to an embodiment of the claimed invention.

FIG. 5 illustrates the operation of a playback controller 215 (FIG. 2). In P2P streaming systems, the playback controller 215 will check every chunk for playback. There are only two types of chunks: a chunk that has finished downloading before its expected playback time (i.e. a non-delayed chunk), or a delayed chunk ($D_i > 0$). For the non-delayed chunk, the playback controller 215 handles it in a simple way, at its expected playback time, move it out of the local chunk buffer 214 (FIG. 2) and send it to the decoder to be played back. When a chunk is delayed, the playback controller must decide how to handle the condition. In the illustrated example, the playback controller makes one of the following choices:

(a) Wait until the chunk is completely received and then send it to the decoder;

(b) Directly send the incomplete chunk to the decoder with no waiting;

(c) Whilst waiting for chunk to complete receiving, a timer is initiated with a pre-defined expiration threshold. Once the timer expires, the playback controller stops waiting and sends the chunk to the decoder immediately.

The timer expiration threshold value can be preset as the longest waiting time (LWT). In this sense, action (a) and (b) are special cases of (c), corresponding to LWT=∞ and LWT=0. The timer expiration threshold and other operational parameters of the playback controller can be adjusted in exemplary embodiments (not shown). It is possible that the incomplete chunk sent to the decoder (by action c above) cannot be decoded and played back because of the implementation of the decoder. The resultant effect in the final processed video is equal to skipping the incomplete chunk.

Figure 6:
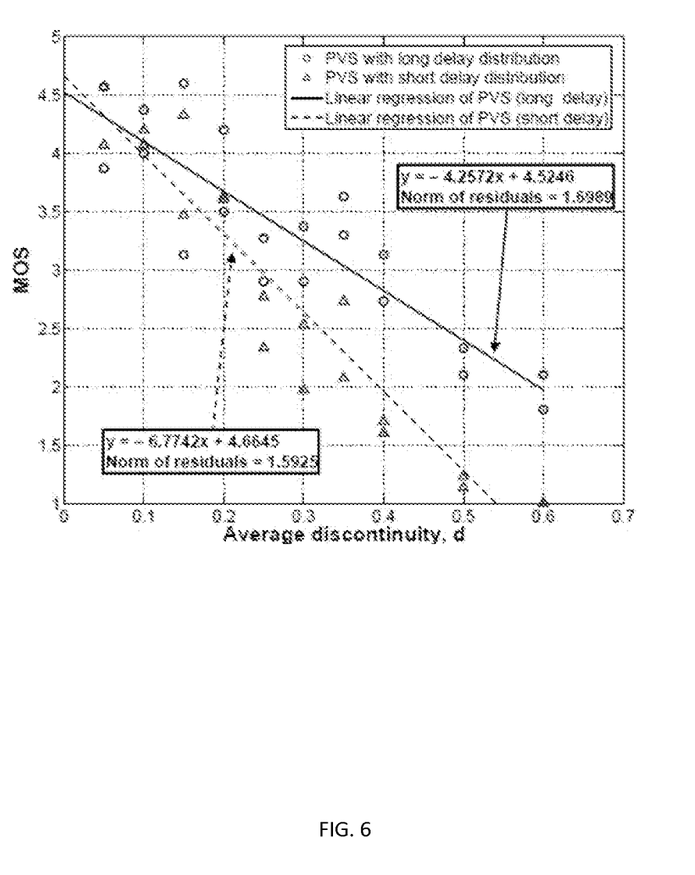
FIG. 6 shows an illustration of correlation between subjective user QoE and average discontinuity for different types of video content bitstreams.

Referring to FIG. 6, this graph illustrates the correlation between subjective QoE and network transport effects for an experiment employing the method of the claimed invention. In this experiment, the relationship between the average playback discontinuity, which is affected by the data segment delay distribution and the playback strategy, and QoE using a MOS ranking system was determined.

In this experiment, 50 source video clips with average length of 30 seconds of various categories were used. 30 end users (16 males and 14 females) in the age range 18-28 participated. The assessment scheme was Absolute Category Rating (ACR) with hidden reference. Table 1 below shows MOS ranking system used by end users.

TABLE 1

| Score | 5 | 4 | 3 | 2 | 1 |
|---|---|---|---|---|---|
| Subjective feeling | Excellent | Good | Fair | Poor | Bad |

The playback strategy employed was straightforward. If any video chunk received was incomplete within the longest waiting time (LWT), it was discarded. Otherwise the video chunk was decoded and the processed video was played back by each end user's peer client on the end user's display. If no chunk was received by the peer client at the expected playback time, the decoder froze at the last playable image until new content arrived.

Due to the implementation of the decoder, there were three possible viewing effects caused by chunk-level distortions:

(i) $D_i=0$, no distortion. If chunk i was completed before its expected playback time, it was normally decoded and played back.

(ii) $0<D_i<LWT$, freeze-and-play viewing effect. If chunk i was delayed but still completed before LWT, the resulting effect in the processed video is firstly freezing at an image for duration of $D_i$ and then normally playing back chunk i.

(iii) $D_i>=LWT$, freeze-and-discard viewing effect. If chunk i was delayed and remained incomplete when LWT expires, the effect in PVS is freezing at an image for LWT and then directly jumping to chunk i+1.

The average discontinuity, d, was calculated according to the equation: (d=1−c), where c is the ratio of the continuous viewing time to the total viewing time (including waiting time).

Two types of data segment delay distribution were used, a short delay distribution where delays were uniformly distributed in [0, 2] seconds, and a long delay distribution where all delays were equal to 3 seconds (equal to the LWT as LWT is set 3 seconds by default).

Experimental bias in the subjective MOS scoring process was eliminated through the use of DMOS metric, derived by subtracting the MOS of the PVS from the MOS of the reference video (of same category and with no distortion) according to the following equation:

$$DMOS=MOS_{cat.}(d)-MOS_{cat.}(r)+6$$

The DMOS (not shown) was found to be consistent with MOS analysis meaning that the experiment results were reasonable.

As can be seen from FIG. 6, there is a correlation between an objective metric (here, the average discontinuity) and a subjective QoE metric. In this particular experiment, the practical conclusion is that end users care more about the number of screen freezing events than the duration of each freezing event.

The present invention may be implemented using general purpose or specialized computers or microprocessors programmed according to the teachings of the present disclosure. Computer instructions or software codes running in the general purpose or specialized computers or microprocessors can readily be prepared by practitioners skilled in the software art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer implementable method of evaluating effects of chunk-level transport distortion on data segments of media content bitstream over a network, comprising:
   providing data segments from a single continuous media content bitstream,
   generating network transport distorted sequence of data segments by one or more methods selected from live experiments, simulation, or artificial generation during transport of the sequential data segments, wherein each said method is used to generate either a data segment delay distribution (DSDD) or a data segment receiving pattern (DSRP),
   receiving the distorted sequence of data segments,
   implementing a playback strategy based on segments delay and controlled by a playback controller of each of the sequential data segments received, and
   evaluating a playback performance of the media content bitstream under the playback strategy based on segments delay, comprising:
   obtaining a subjective quality of experience user metric of the playback performance of the playback of the distorted sequence of data segments, and
   determining a correlation between said network transport distortion and the subjective quality of experience user metric of the playback performance;
   wherein each of the data segments is a chunk; and
   wherein the subjective quality of experience user metric is obtained from a Mean Opinion Scoring (MOS) ranking system based on subjective assessment by one or more end users upon observing one or more viewing effects caused by the network transport distortion during the playback performance of the media content bitstream.

2. The computer implementable method according to claim 1, wherein said network is a peer-to-peer network.

3. The computer implementable method according to claim 1, wherein said media content bitstream is a streaming media content bitstream.

4. The computer implementable method according to claim 1, wherein said DSDD is an aggregate statistic for all delayed data segments and is represented by a discrete random variable, and for a set of discrete random number, $X=\{x_i\}$, all the delayed data segments encounter a delay length with equal probability, where x, is a delay length and i=1 ... n.

5. The computer implementable method according to claim 1, wherein said DSRP describes a data segment filled over a whole downloading process, and a download completion percentage of data segment i at time t is denoted as:

$$f_i(t), t \in [T^s_i, T^c_i]$$

$$f_i(T^s_i)=0; f_i(T^c_i)=1$$

where $f_i(t)$ is a non-decreasing function, $T_i^s$ is the download start time of the data segment i and $T_i^c$ is the download completion time of the data segment i.

\* \* \* \* \*